United States Patent
Okuno et al.

(10) Patent No.: US 11,552,350 B2
(45) Date of Patent: Jan. 10, 2023

(54) VEHICLE BATTERY PACK

(71) Applicant: TOYOTA JIDOSHA KABUSHIKI KAISHA, Aichi-ken (JP)

(72) Inventors: Nobuhiro Okuno, Toyota (JP); Yasumasa Horibe, Nagakute (JP); Hisanori Koma, Miyoshi (JP); Tsuyoshi Okada, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 212 days.

(21) Appl. No.: 17/079,526

(22) Filed: Oct. 26, 2020

(65) Prior Publication Data

US 2021/0234213 A1 Jul. 29, 2021

(30) Foreign Application Priority Data

Jan. 24, 2020 (JP) .............................. JP2020-010341

(51) Int. Cl.
| | |
|---|---|
| *H01M 10/6556* | (2014.01) |
| *H01M 10/625* | (2014.01) |
| *B60K 1/04* | (2019.01) |
| *H01M 50/20* | (2021.01) |

(52) U.S. Cl.
CPC .......... *H01M 10/6556* (2015.04); *B60K 1/04* (2013.01); *H01M 10/625* (2015.04); *H01M 50/20* (2021.01); *B60K 2001/0438* (2013.01); *H01M 2220/20* (2013.01)

(58) Field of Classification Search
CPC .... B60K 1/04; B60K 11/04; B60K 2001/005; B60K 2001/0438; B60L 1/003; B60L 2240/662; B60L 50/64; B60L 50/66; B60L 58/26; H01M 10/613; H01M 10/615; H01M 10/625; H01M 10/6556; H01M 10/6567; H01M 10/6568; H01M 2220/20; H01M 50/20; H01M 50/204; Y02E 60/10; Y02T 10/70; Y02T 10/72; Y02T 90/16
See application file for complete search history.

(56) References Cited

U.S. PATENT DOCUMENTS

2010/0112429 A1* 5/2010 Murata ............. H01M 10/6554
429/120

FOREIGN PATENT DOCUMENTS

| JP | 2019129042 A | 8/2019 | |
|---|---|---|---|
| WO | WO-2015137869 A1 * | 9/2015 | ............... B60K 1/04 |

* cited by examiner

*Primary Examiner* — Victoria H Lynch
(74) *Attorney, Agent, or Firm* — Hauptman Ham, LLP

(57) ABSTRACT

A vehicle battery pack includes: a battery; a radiator; a passage via which the battery is connected to the radiator; a pump configured to circulate coolant between the battery and the radiator through the passage; and a case in which the battery, the radiator, the passage, and the pump are accommodated, the case having an intake opening and a discharge opening for external air.

7 Claims, 3 Drawing Sheets

VEHICLE BATTERY PACK

CROSS-REFERENCE TO RELATED APPLICATION

This application claims priority to Japanese Patent Application No. 2020-010341 filed on Jan. 24, 2020, incorporated herein by reference in its entirety.

BACKGROUND

1. Technical Field

The present disclosure relates to a battery pack for a vehicle.

2. Description of Related Art

Japanese Unexamined Patent Application Publication No. 2019-129042 (JP 2019-129042 A) describes a battery unit (a battery pack) mounted below a floor panel of a vehicle. The battery unit includes a battery module in which a plurality of battery cells is laminated, and a battery outer case in which the battery module is accommodated. The battery module is accommodated in a module case and is configured to be cooled down by a water jacket formed on a bottom face of the module case. In such a liquid-cooling system, minute thermal management is performable in comparison with an air-cooling system using a fan or the like, so that efficiency of a battery improves.

SUMMARY

The related art described above does not mention cooling of coolant in the water jacket, but a radiator for cooling down the coolant is required. Such a radiator is placed outside the battery pack in general, and therefore, it is necessary to connect the radiator to the battery pack with a pipe. This consequently causes such a problem that mounting of the battery pack on a vehicle becomes complicated.

The present disclosure is achieved in consideration of the above fact, and an object of the present disclosure is to provide a vehicle battery pack easily mountable on a vehicle even when the vehicle battery pack employs a liquid-cooling system.

A vehicle battery pack according to a first aspect of the present disclosure includes a battery, a radiator, a passage, a pump, and a case. The battery is connected to the radiator via the passage. The pump is configured to circulate coolant between the battery and the radiator through the passage. The battery, the radiator, the passage, and the pump are accommodated in the case, and the case has an intake opening and a discharge opening for external air.

In the disclosure according to the first aspect, when the pump operates, the coolant circulates between the battery and the radiator through the passage via which the battery is connected to the radiator. Hereby, in comparison with an air-cooling system, minute thermal management is performable, so that efficiency of the battery improves. Besides, the battery, the radiator, the passage, and the pump are accommodated in the case having the intake opening and the discharge opening for external air, and heat exchange is performed between the external air thus taken into the case and the coolant flowing through the radiator. That is, constituents for cooling the coolant are all provided inside the case. Hereby, at the time when the vehicle battery pack is mounted on the vehicle, it is not necessary to connect the battery to the radiator via a pipe, so that the vehicle battery pack is easily mounted on the vehicle.

A vehicle battery pack according to a second aspect of the present disclosure may be configured as follows. That is, in the first aspect, in a state where the radiator is provided in a vehicle, the radiator may be placed in such a posture that a front face of the radiator faces downward in the vehicle up-down direction, and a back face of the radiator faces upward in the vehicle up-down direction.

In the disclosure according to the second aspect, in a state where the radiator is provided in the vehicle, the radiator is placed in such a posture that the front face of the radiator faces downward in the vehicle up-down direction, and the back face of the radiator faces upward in the vehicle up-down direction. This can restrain the dimension of the case in the vehicle up-down direction from increasing.

A vehicle battery pack according to a third aspect of the present disclosure may be configured as follows. That is, in the second aspect, the case may be provided below a floor of the vehicle. The intake opening may be formed on a lower wall of the case. The discharge opening may be formed on at least one of an upper wall and a rear wall of the case.

In the disclosure according to the third aspect, the radiator is accommodated inside the case provided below a floor of the vehicle. The radiator is placed inside the case in such a posture that the front face faces downward in the vehicle up-down direction, and the back face faces upward in the vehicle up-down direction. The intake opening for external air is formed on the lower wall of the case. Hereby, the external air (travel wind) passing below the lower wall of the case at the time of traveling of the vehicle can be successfully taken into the case from the intake opening. The external air taken into the case passes through the radiator from the front face side to the back face side and is discharged to outside the case from the discharge opening formed on at least the upper wall and the rear wall of the case. This allows the external air taken into the case to be successfully discharged to outside the case from the discharge opening.

A vehicle battery pack according to a fourth aspect of the present disclosure may be configured as follows. That is, in the third aspect, the radiator may be placed in a posture inclined forward toward a front side in the vehicle front-rear direction when the radiator is viewed from the vehicle width direction.

In the disclosure according to the fourth aspect, the radiator is placed in an inclined posture as described above. This accordingly causes the external air (travel wind) to easily hit the radiator, the external air flowing into the case toward the upper side in the vehicle up-down direction and the rear side in the vehicle front-rear direction from the intake opening of the case placed below the radiator in the vehicle up-down direction.

A vehicle battery pack according to a fifth aspect of the present disclosure may be configured as follows. That is, in any one of the first to fourth aspects, the vehicle battery pack may further include at least one of an intake air guide portion configured to guide, to the radiator, external air taken into the case from the intake opening, and a discharge air guide portion configured to guide the external air passing through the radiator to the discharge opening.

In the disclosure according to the fifth aspect, at least one of the intake air guide portion and the discharge air guide portion is provided. In a case where the intake air guide portion is provided, the external air taken into the case from the intake opening of the case can be successfully guided to the radiator by the intake air guide portion. Further, in a case where the discharge air guide portion is provided, the external air passing through the radiator can be successfully guided to the discharge opening of the case by the discharge air guide portion.

A vehicle battery pack according to a sixth aspect of the present disclosure may be configured as follows. That is, in any one of the first to fifth aspects, the vehicle battery pack may include: a compressor configured to compress refrigerant; a condenser configured to condense the refrigerant; a heat exchanger configured to perform heat exchange between the refrigerant and the coolant; and a liquid heater configured to heat the coolant. The compressor, the condenser, the heat exchanger, and the liquid heater may be accommodated in the case.

In the disclosure according to the sixth aspect, the refrigerant is compressed by the compressor, the refrigerant is condensed by the condenser, and heat exchange is performed between the refrigerant and the coolant in the heat exchanger. Hereby, it is possible to sufficiently cool down the coolant. Further, the coolant can be heated by the liquid heater. Hereby, more minute thermal management is performable, so that the efficiency of the battery further improves. Besides, since the compressor, the condenser, the heat exchanger, and the liquid heater are accommodated in the case, such an effect of easy mounting of the vehicle battery pack on the vehicle can be maintained.

A vehicle battery pack according to a seventh aspect of the present disclosure may be configured as follows. That is, in the sixth aspect, the radiator may be placed in a rear end part, in the vehicle front-rear direction, inside the case.

In the disclosure according to the seventh aspect, the radiator is placed in the rear end part, in the vehicle front-rear direction, inside the case in which the compressor, the condenser, the heat exchanger, and so on are accommodated. Hereby, it is possible to prevent or restrain the external air (hot air) from hitting cooling devices, i.e., the compressor, the condenser, and the heat exchanger, the external air being taken into the case from the intake opening of the case and passing through the radiator.

A vehicle battery pack according to an eighth aspect of the present disclosure may be configured as follows. That is, in any one of the first to seventh aspects, the battery may include: a battery module configured such that a plurality of battery cells is electrically connected to each other; and a housing in which the battery module is accommodated in a state where the battery module is immersed in the coolant.

In the disclosure according to the eighth aspect, the battery is configured such that the battery module in which the battery cells are electrically connected to each other is accommodated inside the housing in a state where the battery module is immersed in the coolant. Hereby, in comparison with a configuration in which the battery module is cooled down by a water jacket, for example, it is possible to improve cooling performance for the battery module.

As described above, the vehicle battery pack according to the present disclosure is easily mountable on the vehicle even through the vehicle battery pack employs a liquid-cooling system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The following describes a vehicle battery pack 10 according to an embodiment of the present disclosure with reference to FIGS. 1 to 6. Note that an arrow FR, an arrow RH, and an arrow UP shown appropriately in each figure indicate the front side (the advance side) in the vehicle front-rear direction of a vehicle V on which the vehicle battery pack 10 is mounted, the right side in the vehicle width direction of the vehicle V, and the upper side in the vehicle up-down direction of the vehicle V, respectively. The vehicle V is an electric vehicle as an example. Hereinafter, in a case where a description is made by use of merely a front side and a rear side, a right side and a left side, and an upper side and a lower side, they indicate the front and rear sides in the vehicle front-rear direction, the right and left sides in the vehicle right-left direction, and the upper and lower sides in the vehicle up-down direction, respectively, unless otherwise specified.

Configuration

Figure 1:
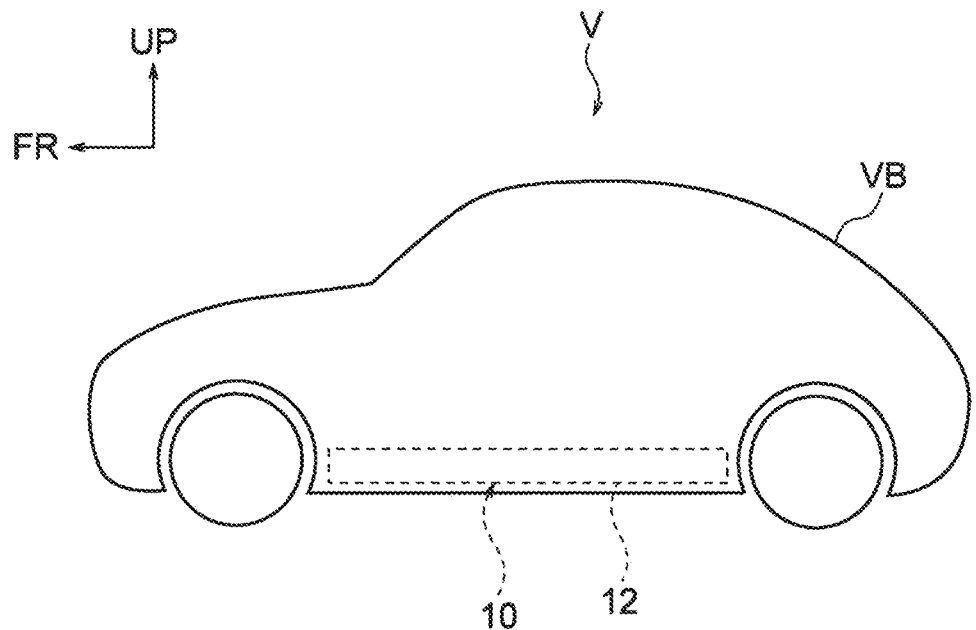
FIG. 1 is a side view illustrating a vehicle on which a vehicle battery pack according to an embodiment is mounted.
Figure 2:
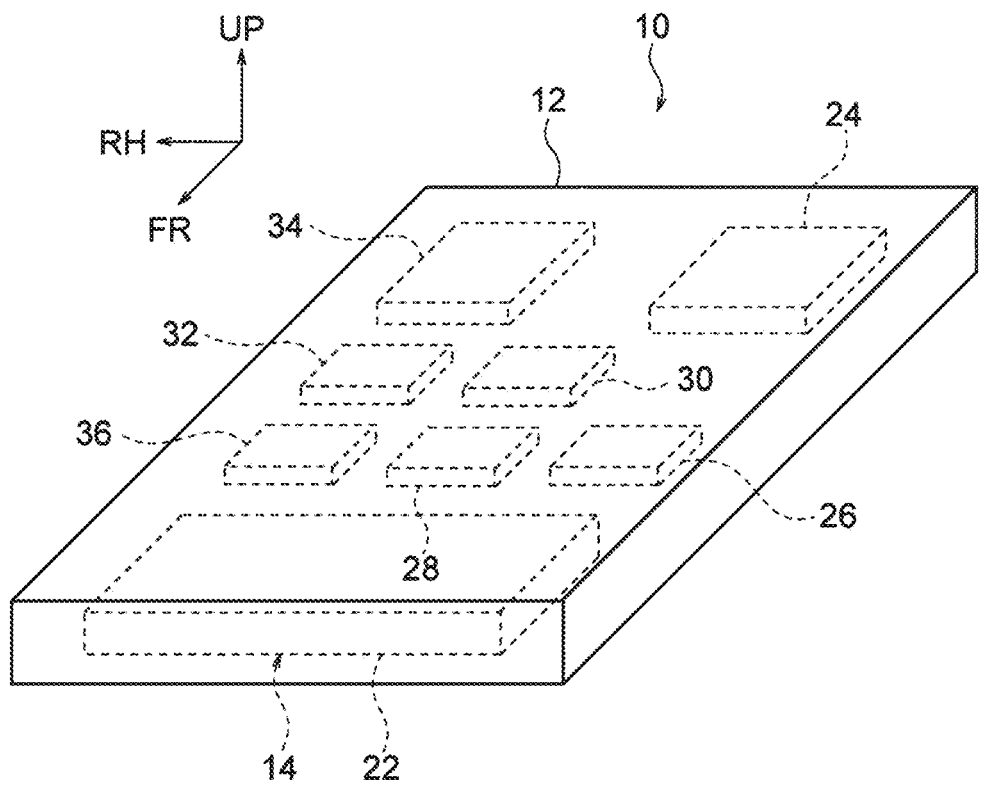
FIG. 2 is a perspective view illustrating the vehicle battery pack according to the embodiment.
Figure 3:
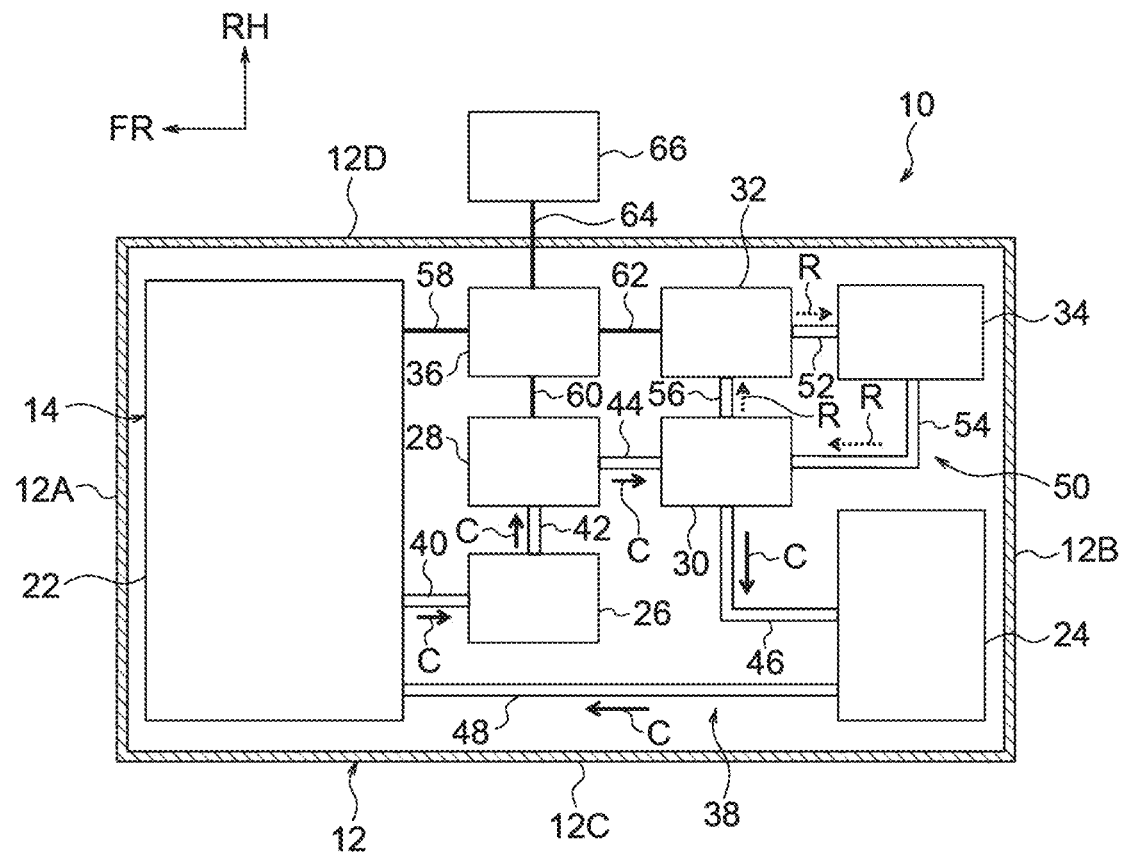
FIG. 3 is a plan sectional view illustrating the vehicle battery pack according to the embodiment.
Figure 4:
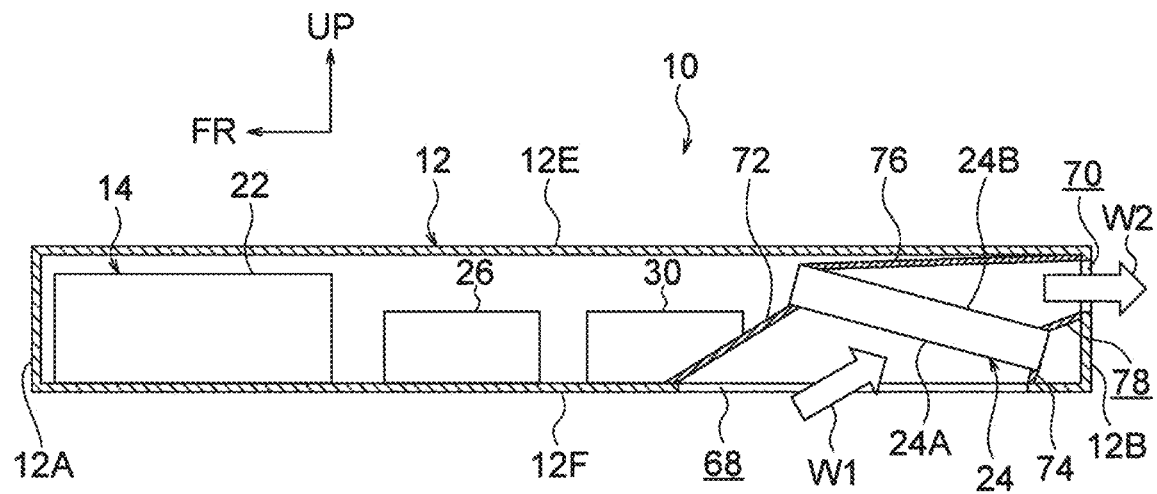
FIG. 4 is a sectional side view illustrating the vehicle battery pack according to the embodiment.
Figure 5:
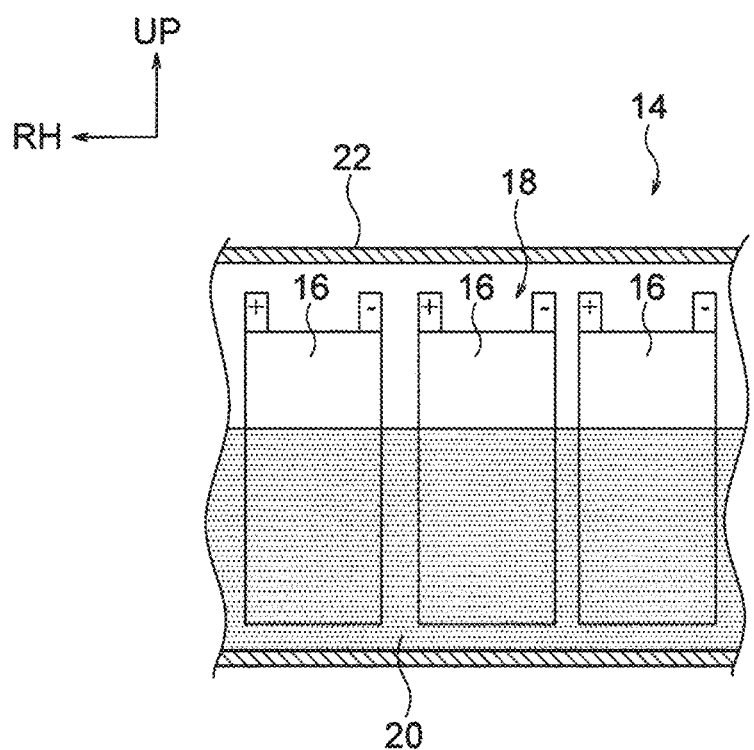
FIG. 5 is a sectional side view illustrating a partial configuration of a battery according to the embodiment.
Figure 6:
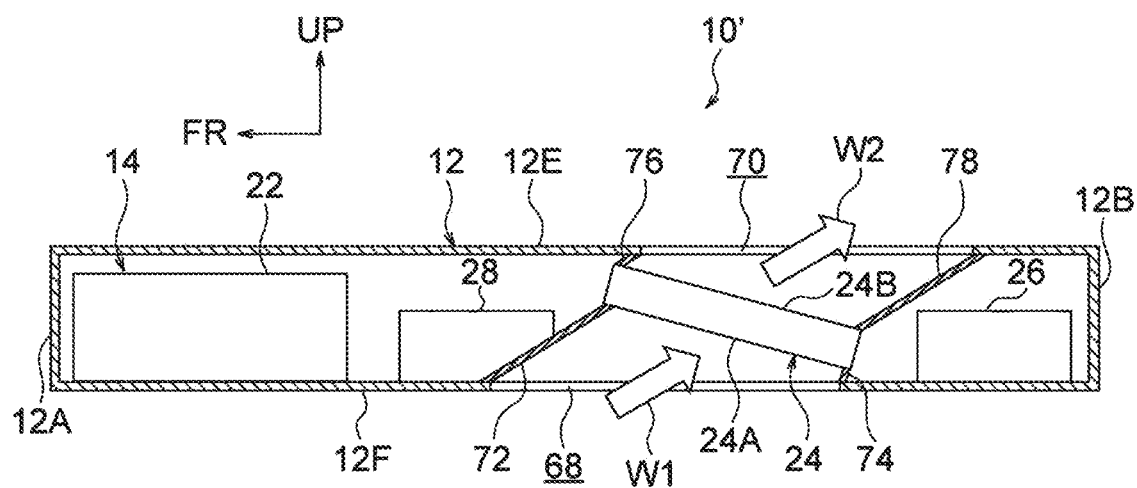
FIG. 6 is a sectional side view illustrating the vehicle battery pack according to a modification of the embodiment.

As illustrated in FIG. 1, the vehicle battery pack 10 according to the present embodiment is mounted under the floor of the vehicle V (that is, below a floor panel (not shown)). As illustrated in FIGS. 2 to 4, the vehicle battery pack 10 includes a case 12 constituting an outer wall of the vehicle battery pack 10. The case 12 is formed in a flat box shape elongated in the vehicle front-rear direction and is fixed to a vehicle body VB of the vehicle V by means such as bolt fastening.

A plurality of accessories is accommodated in the case 12 in addition to the battery 14. The accessories include, as an example, a radiator 24, a plurality of pipes 40, 42, 44, 46, 48 (not shown except for FIG. 3), a water pump 26 as a pump, a liquid heater 28, a heat exchanger 30, a compressor 32, a condenser 34, a plurality of pipes 52, 54, 56 (not shown except for FIG. 3), and a power supply distribution box 36.

The battery 14, the water pump 26, the liquid heater 28, the heat exchanger 30, and the radiator 24 are connected to each other via the pipes 40, 42, 44, 46, 48. The water pump 26, the liquid heater 28, the heat exchanger 30, and the pipes 40, 42, 44, 46, 48 form a passage 38 via which the battery 14 is connected to the radiator 24.

The compressor 32, the condenser 34, and the heat exchanger 30 are connected to each other via the pipes 52, 54, 56. The compressor 32, the condenser 34, the heat exchanger 30, and the pipes 52, 54, 56 form a passage 50 that is different from the passage 38. Hereinafter, each constituent will be described in detail.

The battery 14 is a battery configured to supply electric power to an electric motor (not shown) for causing the vehicle V to travel and constitutes a body portion of the battery pack 10. The battery 14 includes a battery module 18 configured such that a plurality of battery cells 16 (see FIG.

5) is electrically connected to each other, a housing 22 in which the battery module 18 is accommodated in a state where the battery module 18 is immersed in coolant 20 (not shown except for FIG. 5), and a battery electronic control unit (ECU) (not shown). Although not illustrated herein, a plurality of battery modules 18 is accommodated in the housing 22.

The coolant 20 is liquid having an electrically insulating property so as not to cause short-circuit in the battery cells 16. The coolant is, for example, insulating oil such as cooling oil used for a machine tool and so on, transformer oil, triphenyl phosphate, trioctyl phosphate, hydro-fluoroether, fluorine-based inactive liquid, or the like.

The battery cells 16 are lithium-ion secondary batteries, for example, and are placed in such a posture that terminals (no reference sign attached) are placed in their upper ends. The lower side from an upper part of each of the battery cells 16 is immersed in the coolant 20. A sealing member (not shown), for example, is placed between adjacent battery cells 16 above the coolant 20 so as to prevent the coolant 20 from splashing the terminals of the battery cells 16. In order to grasp the state of the battery 14, the battery ECU measures a voltage, a current, a temperature, and so on of each of the battery modules 18 and monitors input and output to each of the battery modules 18.

The radiator 24 is a heat exchanger configured to dissipate heat of the coolant 20 and is configured such that a radiator core (not shown) is provided as a main part. The radiator core includes, for example, a plurality of tubes arranged in parallel to each other and a plurality of corrugated fins provided between the tubes, and the coolant 20 flows through the tubes.

The water pump 26 is connected to the battery 14 via the pipe 40, the liquid heater 28 is connected to the water pump 26 via the pipe 42, and the heat exchanger 30 is connected to the liquid heater 28 via the pipe 44. Further, the radiator 24 is connected to the heat exchanger 30 via the pipe 46 and is connected to the battery 14 via the pipe 48.

When the water pump 26 operates, the coolant 20 in the housing 22 of the battery 14 passes through the water pump 26, the liquid heater 28, and the heat exchanger 30 such that the coolant 20 circulates between the battery 14 and the radiator 24. Further, when the liquid heater 28 operates, the coolant 20 circulating as described above is heated by the liquid heater 28. Note that an arrow C in FIG. 3 indicates a direction where the coolant 20 flows.

In the meantime, refrigerant (not shown) (e.g., hydrofluorocarbon) flows through the passage 50 constituted by the compressor 32, the condenser 34, the heat exchanger 30, and the pipes 52, 54, 56. In the passage 50, the refrigerant is compressed by the compressor 32, the refrigerant is condensed by the condenser 34, and heat exchange is performed between the refrigerant and the coolant 20 in the heat exchanger 30. Hereby, the coolant 20 is cooled down. Note that an arrow R in FIG. 3 indicates a direction where the refrigerant flows.

The battery 14, the liquid heater 28, and the compressor 32 are connected to the power supply distribution box 36 via wiring lines 58, 60, 62 (not shown except for FIG. 3). The power supply distribution box 36 is connected to a connecting portion 66 on the vehicle side via a wiring line 64 extending to outside the case 12 (the connecting portion 66 and the wiring line 64 are not shown except for FIG. 3). The electric motor for causing the vehicle V to travel and a control device (both not shown) are electrically connected to the connecting portion 66 on the vehicle side. The control device is configured to adjust electric power to be supplied from the battery 14 to the electric motor in conjunction with an operation of an accelerator pedal (not shown) provided in the vehicle V.

In the present embodiment, as an example, the battery 14 is placed in a front end part inside the case 12 as illustrated in FIGS. 2 to 4. The water pump 26, the liquid heater 28, and the power supply distribution box 36 are arranged in the right-left direction behind the battery 14. The heat exchanger 30 and the compressor 32 are arranged in the right-left direction behind the water pump 26, the liquid heater 28, and the power supply distribution box 36. Further, the radiator 24 and the condenser 34 are placed behind the heat exchanger 30 and the compressor 32 so as to be arranged in the right-left direction in a rear end part inside the case 12.

Further, in the present embodiment, as illustrated in FIG. 4, the radiator 24 is placed in a posture inclined forward toward the front side when the radiator 24 is viewed from the right-left direction (the vehicle width direction), such that a front face 24A of the radiator 24 faces downward, and a back face 24B of the radiator 24 faces upward. An intake opening 68 (not shown except for FIG. 4) for external air (that is, travel wind) is formed on a lower wall 12F of the case 12, and a discharge opening 70 (not shown except for FIG. 4) for travel wind is formed on a rear wall 12B of the case 12. The intake opening 68 faces the front face 24A of the radiator 24 from the lower side, and the discharge opening 70 faces the back face 24B of the radiator 24 from the rear side. Note that, in FIG. 4, 12A indicates a front wall of the case 12, 12C indicates a left wall of the case 12, and 12D indicates a right wall of the case 12.

Further, intake air guide plates 72, 74 (not shown except for FIG. 4) and discharge air guide plates 76, 78 (not shown except for FIG. 4) are disposed inside the case 12. The intake air guide plates 72, 74 are provided as intake air guide portions configured to guide, to the radiator 24, travel wind (see an arrow W1 in FIG. 4) taken into the case 12 from the intake opening 68. The discharge air guide plates 76, 78 are provided as discharge air guide portions configured to guide travel wind (see an arrow W2 in FIG. 4) passing through the radiator 24 to the discharge opening 70. The intake air guide plates 72, 74 and the discharge air guide plates 76, 78 are formed in a plate shape and placed to be inclined to become upslope toward the rear side when they are viewed from the right-left direction. Note that the intake air guide portions and the discharge air guide portions are not limited to plate-shaped portions. For example, the intake air guide portions and the discharge air guide portions may have a duct shape.

The travel wind taken into the case 12 from the intake opening 68 hits the radiator 24 from the front face 24A side and passes through the radiator core (not shown) to the back face 24B side of the radiator 24. At this time, heat exchange is performed between the travel wind and the coolant 20.

Operations and Effects

The following describes operations and effects of the present embodiment.

In the vehicle battery pack 10 configured as described above, when the water pump 26 operates, the coolant 20 circulates between the battery 14 and the radiator 24 through the passage 38 that connects the battery 14 to the radiator 24. Hereby, in comparison with the air-cooling system, minute thermal management is performable, so that efficiency of the battery 14 improves. As a result, it is not necessary to provide many batteries 14 to secure a cruising distance of the vehicle V, for example, and this can contribute to downsizing of a battery capacity.

Besides, the battery 14, the radiator 24, the passage 38, and the water pump 26 are accommodated in the case 12 having the intake opening 68 and the discharge opening 70 for external air, and heat exchange is performed between the external air thus taken into the case 12 and the coolant 20 flowing through the radiator 24. That is, constituents for cooling the coolant 20 are all provided inside the case 12. Hereby, at the time when the vehicle battery pack 10 is provided in the vehicle V, it is not necessary to connect the battery 14 to the radiator 24 with a pipe, or it is not necessary to wire a wiring line to the water pump 26. This achieves easy mounting of the vehicle battery pack 10 on the vehicle V.

Further, in the present embodiment, the radiator 24 is placed inside the case 12 in such a posture that the front face 24A faces downward in the vehicle up-down direction, and the back face 24B faces upward in the vehicle up-down direction. This can restrain the dimension of the case 12 in the vehicle up-down direction from increasing.

Further, in the present embodiment, the radiator 24 is accommodated in the case 12 provided below the floor of the vehicle V. The intake opening 68 for external air is formed on the lower wall 12F of the case 12 such that the intake opening 68 faces the front face 24A of the radiator 24. Hereby, the external air (travel wind) passing below the lower wall 12F of the case 12 at the time of traveling of the vehicle V can be successfully taken into the case 12 from the intake opening 68. The travel wind taken into the case 12 passes through the radiator 24 from the front face 24A side to the back face 24B side and is discharged to outside the case 12 from the discharge opening 70 that is formed on the rear wall 12B of the case 12 such that the discharge opening 70 faces the back face 24B of the radiator 24. This allows the travel wind taken into the case 12 to be successfully discharged to outside the case 12 from the discharge opening 70.

Besides, in the present embodiment, the radiator 24 is placed in a posture inclined forward toward the front side when the radiator 24 is viewed from the width direction (the right-left direction) of the vehicle V. This allows the travel wind to easily hit the radiator 24, the travel wind flowing into the case 12 toward the upper side and the rear side from the intake opening 68 of the case 12, the intake opening 68 being placed below the radiator 24.

Further, in the present embodiment, the intake air guide plates 72, 74 configured to guide, to the radiator 24, the travel wind taken into the case 12 from the intake opening 68, and the discharge air guide plates 76, 78 configured to guide the travel wind passing through the radiator 24 to the discharge opening 70 are provided. This makes it possible to successfully guide the travel wind to the radiator 24 and successfully guide the travel wind passing through the radiator 24 to the discharge opening 70.

Further, in the present embodiment, the refrigerant is compressed by the compressor 32, the refrigerant is condensed by the condenser 34, and heat exchange is performed between the refrigerant and the coolant 20 in the heat exchanger 30. Hereby, it is possible to sufficiently cool down the coolant 20. Further, the coolant 20 can be heated by the liquid heater 28. Hereby, more minute thermal management is performable, so that the efficiency of the battery 14 further improves. Besides, since the compressor 32, the condenser 34, the heat exchanger 30, and the liquid heater 28 are accommodated in the case 12, an effect of easy mounting of the vehicle battery pack 10 on the vehicle V can be maintained.

Further, in the present embodiment, the radiator 24 is placed in the rear end part inside the case 12 in which the compressor 32, the condenser 34, the heat exchanger 30, and so on are accommodated. Hereby, it is possible to prevent or restrain the travel wind (that is, hot air) from hitting cooling devices, i.e., the compressor 32, the condenser 34, and the heat exchanger 30, the travel wind being taken into the case 12 from the intake opening 68 of the case 12 and passing through the radiator 24.

Further, in the present embodiment, the battery 14 is configured such that the battery modules 18 each configured such that the battery cells 16 are electrically connected to each other are accommodated in the housing 22 in a state where the battery modules 18 are immersed in the coolant 20. Hereby, in comparison with a configuration in which the battery modules 18 are cooled down by a water jacket, for example, it is possible to improve cooling performance for each of the battery modules 18.

Supplementary Description of Embodiments

In the above embodiment, the battery 14 is configured such that the battery modules 18 are accommodated in the housing 22 in a state where the battery modules 18 are immersed in the coolant 20. However, the present disclosure is not limited to this. The battery 14 may be configured such that a water jacket for cooling down the battery modules 18 is provided in the housing 22.

Further, in the above embodiment, the radiator 24 is placed in the rear end part, in the vehicle front-rear direction, inside the case 12. However, the present disclosure is not limited to this. For example, like a modification illustrated in FIG. 6, the radiator 24 may be placed in an intermediate part, in the vehicle front-rear direction, inside the case 12. In this modification, the discharge opening 70 is formed on the upper wall 12E of the case 12.

Further, in the above embodiment, the compressor 32, the condenser 34, the heat exchanger 30, and the liquid heater 28 are provided. However, the present disclosure is not limited to this. The compressor 32, the condenser 34, the heat exchanger 30, and the liquid heater 28 may be omitted.

Further, in the above embodiment, the intake air guide plates 72, 74 and the discharge air guide plates 76, 78 are provided. However, the present disclosure is not limited to this. Either one or both of the intake air guide plates 72, 74 and the discharge air guide plates 76, 78 may be omitted.

Further, in the above embodiment, the radiator 24 is placed to be inclined forward in such a posture that the front face 24A faces downward in the vehicle up-down direction, and the back face 24B faces upward in the vehicle up-down direction. However, the present disclosure is not limited to this. The posture of the radiator 24 to be placed can be modified appropriately.

Further, in the above embodiment, the intake opening 68 is formed on the lower wall 12F of the case 12. However, the present disclosure is not limited to this. An intake opening may be formed on the front wall 12A of the case 12, for example. In this case, the radiator 24 may be placed in a front end part, in the vehicle front-rear direction, inside the case 12, for example.

Further, in the above embodiment, the vehicle V is an electric vehicle. However, the present disclosure is not limited to this. The vehicle on which the vehicle battery pack according to the present disclosure is mounted may be a hybrid vehicle.

Further, in the above embodiment, the vehicle battery pack 10 is provided below the floor of the vehicle V. However, the present disclosure is not limited to this. A part where the vehicle battery pack according to the present disclosure is mounted is modifiable appropriately, and the vehicle battery pack may be provided inside a cabin of the vehicle, on a deck, or the like. Note that, in a case where the vehicle battery pack according to the present disclosure is provided inside the cabin of the vehicle, for example, it is necessary to add a configuration to guide the external air to the external air intake opening of the case and a configuration to guide, to outside the vehicle, the external air discharged from the external air discharge opening of the case.

In addition, the present disclosure can be performed with various modifications without departing from the gist of the present disclosure. Further, it is needless to say that the scope of the present disclosure is not limited to the above embodiment.

What is claimed is:

1. A vehicle battery pack, comprising:
   a battery;
   a radiator;
   a passage via which the battery is connected to the radiator;
   a pump configured to circulate coolant between the battery and the radiator through the passage; and
   a case in which the battery, the radiator, the passage, and the pump are accommodated, the case having an intake opening and a discharge opening for external air,
   wherein
   in a state where the radiator is provided in a vehicle, the radiator is placed in such a posture that a front face of the radiator faces downward in a vehicle up-down direction, and a back face of the radiator faces upward in the vehicle up-down direction,
   the case is provided below a floor of the vehicle,
   the intake opening is formed on a lower wall of the case,
   the discharge opening is formed on at least one of an upper wall or a rear wall of the case, and
   the radiator is placed in a posture inclined forward toward a front side in a vehicle front-rear direction when the radiator is viewed from a vehicle width direction.

2. The vehicle battery pack according to claim 1, further comprising at least one of
   an intake air guide portion configured to guide, to the radiator, external air taken into the case from the intake opening, or
   a discharge air guide portion configured to guide the external air passing through the radiator to the discharge opening.

3. The vehicle battery pack according to claim 1, further comprising:
   a compressor configured to compress refrigerant;
   a condenser configured to condense the refrigerant;
   a heat exchanger configured to perform heat exchange between the refrigerant and the coolant; and
   a liquid heater configured to heat the coolant,
   wherein the compressor, the condenser, the heat exchanger, and the liquid heater are accommodated in the case.

4. The vehicle battery pack according to claim 3, wherein the radiator is placed in a rear end part, in the vehicle front-rear direction, inside the case.

5. The vehicle battery pack according to claim 1, wherein the battery includes
   a battery module comprising a plurality of battery cells electrically connected to each other, and
   a housing in which the battery module is accommodated in a state where the battery module is immersed in the coolant.

6. A vehicle battery pack, comprising:
   a battery;
   a radiator;
   a passage via which the battery is connected to the radiator;
   a pump configured to circulate coolant between the battery and the radiator through the passage; and
   a case in which the battery, the radiator, the passage, and the pump are accommodated, the case having an intake opening and a discharge opening for external air,
   wherein the vehicle battery back further comprises at least one of
   an intake air guide portion configured to guide, to the radiator, external air taken into the case from the intake opening, or
   a discharge air guide portion configured to guide the external air passing through the radiator to the discharge opening.

7. A vehicle battery pack, comprising:
   a battery;
   a radiator;
   a passage via which the battery is connected to the radiator;
   a pump configured to circulate coolant between the battery and the radiator through the passage;
   a case in which the battery, the radiator, the passage, and the pump are accommodated, the case having an intake opening and a discharge opening for external air;
   a compressor configured to compress refrigerant;
   a condenser configured to condense the refrigerant;
   a heat exchanger configured to perform heat exchange between the refrigerant and the coolant; and
   a liquid heater configured to heat the coolant,
   wherein the compressor, the condenser, the heat exchanger, and the liquid heater are accommodated in the case.

* * * * *